Feb. 16, 1932.   C. G. THOMPSON   1,845,943
AIRCRAFT
Filed June 14, 1930   2 Sheets-Sheet 1
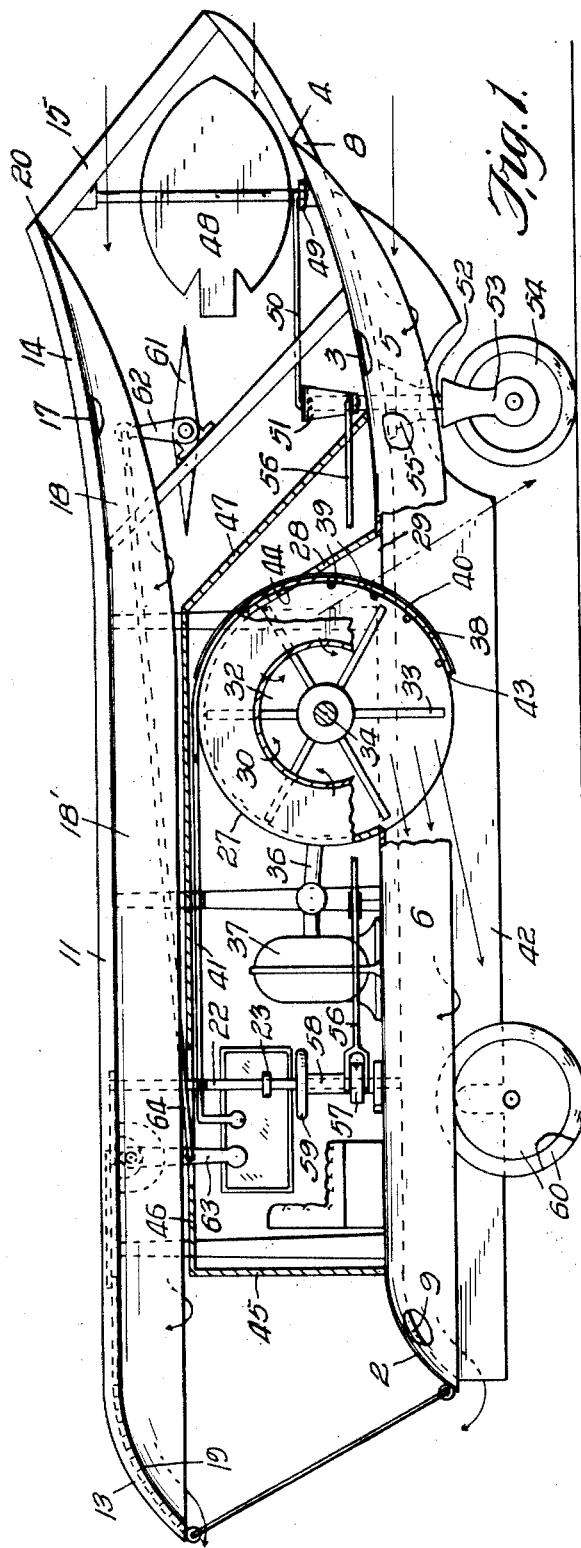
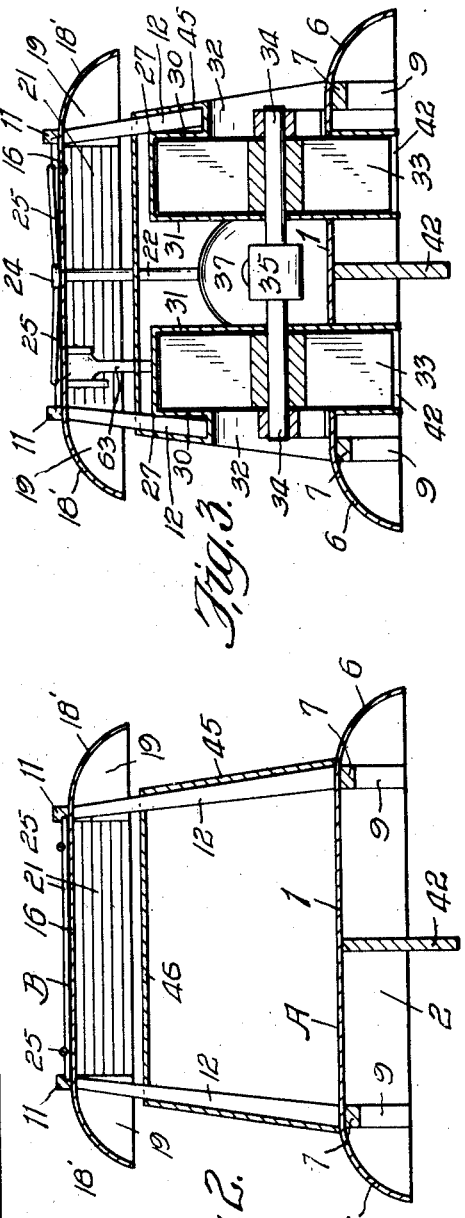
INVENTOR:
C. G. Thompson.
BY
ATTORNEY Feb. 16, 1932.  C. G. THOMPSON  1,845,943
AIRCRAFT
Filed June 14, 1930   2 Sheets-Sheet 2
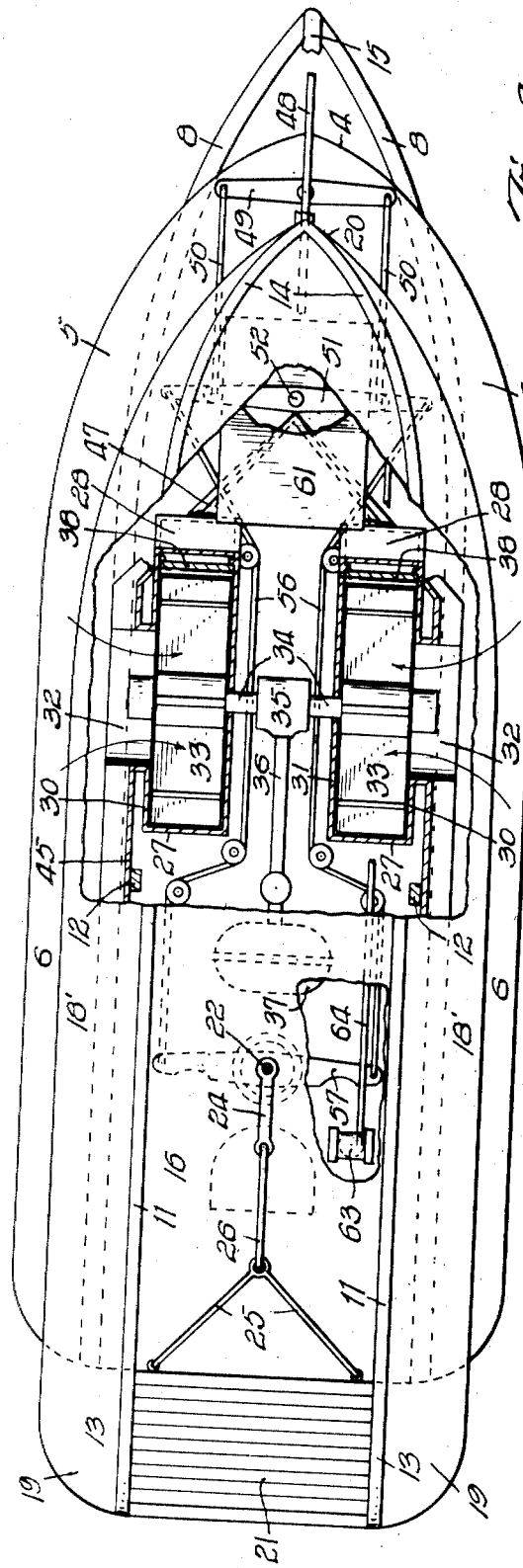
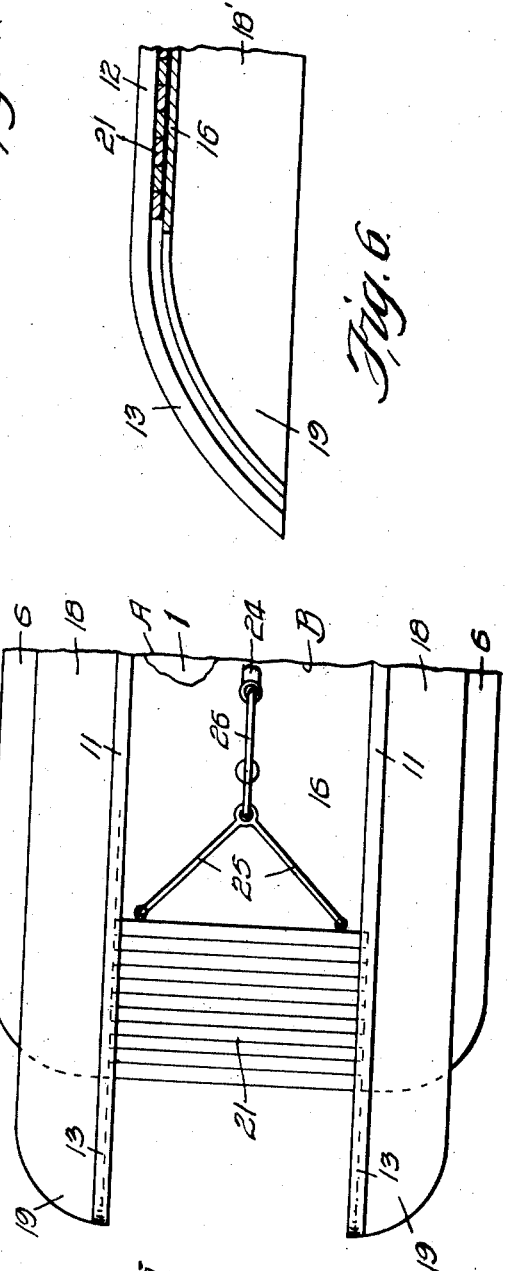
INVENTOR:
BY C. G. Thompson
Fred'k Mason
ATTORNEY Patented Feb. 16, 1932

1,845,943

UNITED STATES PATENT OFFICE

CARL G. THOMPSON, OF ST. LOUIS, MISSOURI

AIRCRAFT

Application filed June 14, 1930. Serial No. 461,226.

My invention relates to aircraft and has particular reference to an airplane driven longitudinally through the air and has to do with the principles involved in airplane suspension and propulsion.

The objects of my invention are first, to provide a ship affording easy penetration of the air while in flight; second, to provide a greater degree of buoyancy than in the present types of ships, thereby rendering it safe in all positions of flying; third, to provide a non-shifting center of gravity for the ship, thus stabilizing equilibrium which will not be easily effected by dead engines or other disturbing influences; fourth, to provide a ship of easy and swift propulsion, requiring only low speed engines of moderate horse power to propel the same; fifth to provide an aircraft substantially free from all lateral rocking and to takeoff, fly and land at all times on a near to level keel; sixth, to provide operative provision to meet strong head winds, to create an abnormal density of the air between the craft and the ground for the ship to ride on and a corresponding excess density of air acting upwardly on undersides of the planes, thereby increasing the buoyancy of the craft in all landings; and, seventh, to provide the craft with means for steering so that take-offs and landings can be made on a circular path of relatively small diameter and to steer clear of all obstacles in a forced landing.

A still further object of the invention is the provision of an aircraft which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1 is a side elevation with portions thereof broken away of an aircraft embodying the features of my invention.

Fig. 2 is a vertical transverse sectional view of the airplane taken on a line just in advance of the rear struts and looking toward the rear of the airplane.

Fig. 3 is a vertical transverse sectional view of the airplane taken on a line approximately midway the front and rear ends of the airplane looking to the rear thereof.

Fig. 4 is a top plan view of the aircraft with portions thereof broken away and portions thereof in sectional elevation.

Fig. 5 is a top plan view of the rear end of the aircraft with a slidable wing section of the upper plane in retracted position.

Fig. 6 is a vertical sectional view of the end of the upper plane.

In carrying out the aim of my present invention, which is an improvement over the aircraft disclosed in my Patent No. 1,723,666, dated August 26th, 1929, I employ a lower approximately shoe horn shaped plane or airfoil A having a flat body portion 1 terminating at opposite ends in reversely curved portions so as to provide a rear curved dipping edge portion 2 providing a concaved convexed cambered trailing edge portion and to provide an upwardly gently curved forward breast portion 3 for the airfoil which terminates in a relatively pointed air penetrating edge 4. The upwardly curved breast portion 3 of the plane is provided with the sweep back curved dipping side edge portions 5 which continue rearwardly to provide the side curved dipping edges 6 that merge at their rear ends with rear curved dipping edge portion 2 of plane A. It will be observed that the dipping edge portions 5 of the breast portion 3 practically fade out at the leading or penetrating edge 4 of the airfoil.

The lower airfoil or plane A is suitably secured upon a plurality of suitable diverging longérons designated 7, the forward ends of which are curved upwardly, as at 8, beyond the leading edge 5 of the airfoil A and their rear ends curved downwardly, as at 9.

Spaced from and disposed a suitable distance above the longérons 7 are a plurality of suitably connected upper diverging longé- rons 11 which are rigidly connected with the lower longérons 7 by means of a plurality of suitable supporting struts 12 to form the frame work of the fuselage. The upper longérons 11 extend beyond the rear ends of the lower longérons 7 and have their rear ends curved downwardly, as at 13, and their forward ends curved gently upwardly, as at 14. The leading or air penetrating end of the upwardly curved portions 14 of the longérons 11 are disposed a suitable distance above and to the rear of the leading or air penetrating end of the upwardly curved portions 8 of the lower longérons 7 and they are connected by means of a suitable narrow inclined connecting member 15.

An upper plane or airfoil B is securely fixed to the under faces of the upper longérons 11 and is similar in shape to the lower plane or airfoil A. It is provided with the flat body section 16 terminating at its forward end in the upwardly gently curved breast portion 17. The breast portion 17 is provided with the sweep back curved dipping side edge portions 18 which continue into the curved dipping side edge portions 18' for the flat body section 16 which at their rear ends curve downwardly to provide the two dipping trailing edge portions 19, the inner edges of which stop with the longérons 11. The sweep back curved dipping side edge portions of the breast portion of the upper plane gradually fade away as they meet at the leading edge of the air penetrating point 20.

The rear end portion of the upper plane B is cut-away a suitable distance back from the rear edges of the dipping side edge portions of the upper plane, and disposed in the open space between the longérons 11 is a suitable flexible trailing plane section 21, which when in closed position closes the cutaway rear portion of the upper plane, as shown in Figs. 2, 3 and 4 and provides a curved dipping trailing edge portion for upper plane B, and when pulled forward, as shown in Figs. 5 and 6, leaves the space between the upper longérons 11 and the rear edge of the flat body section of the upper plane open for the free and undisturbed passage of air under the flat body portion of the upper plane.

The means for imparting sliding movement to the flexible trailing plane section 21 comprises a suitably supported vertical shaft 22 provided with a lever handle 23 for turning the shaft and an arm 24 fixed to the upper end of the shaft 22 which is connected with the forward edge of the flexible plane section 21 through the medium of the diverging connecting rods 25 and a link connection 26.

As clearly shown in Figs. 2 and 3, the upper plane is of less width than the lower plane and extends beyond the rear or trailing edge of the lower plane. The leading edge of the upper plane also preferably falls short of the leading edge of the lower plane.

The means for affording sustenance and propulsion of the ship embodies a plurality of blowers each comprising a housing 27 having the front portion of its wall designated 28 directed downwardly and forwardly from the curved section of the housing. Each housing is provided with an open lower end which registers with a passage 29 in the lower plane and with the side walls 30 and 31 of the housing extending downwardly through the plane passage 29, as clearly shown in Fig. 1. The side wall 30 of each housing is provided with an air inlet passage 32.

Each blower housing 27 is provided with a suitable blower fan 33 rotatably fixed to a supported drive shaft 34 provided with a differential 35 from which is directed a drive shaft 36 connected with a suitable motor or engine 37 for rotating the fan 33 in each blower housing.

Each housing 27 is provided with a flexible slidable outer wall member 38 which passes through the inclined housing wall section 28 and which is guided within the housing by suitable means, such for instance as crossrods 39 and a guide strip 40 to provide a way for the flexible member to slide in. Sliding movement of the flexible member 38 is controlled by means of a connection 41 extending back to a point within reach of the pilot of the ship. As shown in Fig. 1, the flexible slidable housing wall member 38 is in its closed position, thereby shortening the length of the air outlet passage of the housing which causes the air currents under high velocity to be directed downwardly and rearwardly, as indicated by arrows, beneath the lower plane A, upon opposite sides of the stationary stabilizing fin 42, setting up a steady high air pressure beneath the lower plane of the ship from a point to the rear of the leading edge and breast portion of the lower plane to buoyantly support a ship as it is moved forward by the air pressure against the lower plane. In landing, the flexible slidable housing section 38 is moved so that the lower edge 43 thereof comes flush with the opening 44 in the slanting wall of the housing thus permitting the high velocity air currents to exert their pressure downwardly and forwardly as indicated by an arrow in Fig. 1, thereby aiding in retarding the speed of the ship in landing.

The blowers and motor and associated parts are all housed within a suitable cabin 45, the ceiling or top 46 of which lies a suitable distance below the upper plane B and which has its front end wall 47 tapered to cause the air passing from front to rear between the planes when the aircraft is in flight to be densified and create a pressure beneath the upper plane B to assist in the sustenance of the ship when in flight.

A suitable vertical rudder 48 is pivotally supported for movement between the leading edges of the lower and upper planes and is provided with a cross-bar 49. Suitable connecting rods 50 connect the cross-bar 49 with a cross-bar 51 fixed to the upper end of a rotatable shank 52, the lower end of which is provided with a member 53 to which a wheel 54 is rotatably supported. The shank 52 is supported by means of a suitable bearing support 55 carried by the lower plane A. A pair of cable or other suitable connections 56 connect the ends of the cross-bar 51 with the ends of a cross-bar 57 fixed to the lower end of a sleeve 58 supported by the upright shaft 22 so that the guide or lead landing wheel 54 and the rudder 48 can be simultaneously actuated by the feet of the pilot. The upper end of the sleeve 58 is provided with a hand wheel 59 so that the wheel 54 and the rudder 58 can also be actuated by the hands of the pilot.

The aircraft is further provided with a pair of rotatably supported wheels 60 located near the rear end of the ship. The ship being provided with three wheels, it will be observed that the front wheel 54 which acts like a caster wheel will permit the operator to take off on a tract relatively small in diameter as the craft can take a circular path in attaining sufficient speed to lift the same. Likewise in landing, if necessary, to land in a small space.

An elevator 61 is pivotally supported a suitable distance below the breast portion of the upper plane B and is provided with an arm 62 which is connected to a suitable pilot actuated lever 63 by means of a rod 64 carried by the upper plane B adjacent the pilot's seat.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In an aircraft, a plurality of planes adapted to penetrate the air longitudinally, a blower housing carried by the lower plane, a blower fan disposed in said blower housing, said lower plane having an opening therein forming an air discharge passage for the housing and a motor for the fan.

2. In an aircraft, a plurality of planes adapted to penetrate the air longitudinally, a blower housing carried by the lower plane, a blower fan disposed in said blower housing, said lower plane having an opening therein forming an air discharge passage for the housing and a motor for the fan for setting up a cyclonic wind pressure below the lower plane upon which the aircraft shall ride when in flight.

3. In an aircraft, a plurality of substantially shoe-horn shaped planes adapted to penetrate the air longitudinally and blowers for propelling the craft by setting up a cyclonic wind action beneath the lower plane for densifying the air upon which the plane rides.

4. In an aircraft, a plurality of substantially shoe-horn shaped planes adapted to penetrate the air longitudinally, means for densifying air and discharging it below the lower plane intermediate its ends for buoyantly supporting the craft in take-offs, flights and in landing.

5. In an aircraft, a plurality of substantially shoe-horn shaped planes adapted to penetrate the air longitudinally and means in the nature of blowers carried upon the lower plane for creating high pressure air currents to be discharged through openings in the lower plane to provide a densified air cushion below the lower plane of the aircraft and said air currents being discharged intermediate forward and rear ends of the lower plane.

6. In an aircraft, a plurailty of substantially shoe-horn shaped planes adapted to penetrate the air longitudinally, means carried by the lower plane for delivering wind at high velocity through passages therein for exerting constant substantially non-variable pressure beneath the lower plane.

7. In an aircraft structure, a lower plane, an upper plane of less width than the lower plane and disposed in spaced relation with the lower plane with its leading edge behind the leading edge of the lower plane and its trailing edge beyond the trailing edge of the lower plane and means for creating wind at high velocity and delivering it through passages in the lower plane for exerting constant pressure beneath the lower plane in a downward and rearward direction to the rear of the leading edge of the lower plane in take-offs and in flight.

8. In an aircraft structure, a lower plane, an upper plane of less width than the lower plane and disposed in spaced relation with the lower plane with its leading edge behind the leading edge of the lower plane and its trailing edge beyond the trailing edge of the lower plane, means for creating wind at high velocity and delivering it through passages in the lower plane for exerting constant pressure beneath the lower plane in a downward and rearward direction to the rear of the leading edge of the lower plane in take-offs and in flight and slidable means adapted to lengthen wind passages in the lower plane toward the leading edge thereof for directing the high velocity wind pressure downwardly toward the leading edge of the lower plane when making a landing.

9. In an aircraft structure, a lower plane, an upper plane of less width than the lower plane and disposed in spaced relation with the lower plane with its leading edge behind the leading edge of the lower plane and its trailing edge beyond the trailing edge of the lower plane, a slidable trailing section for the upper plane, a vertical stabilizing fin longitudinally of the lower plane depending from the medial line thereof, a vertical rudder disposed between the leading edges of the planes, means for controlling said rudder, an elevator disposed between the planes to the rear of the vertical rudder, means for controlling said elevator, and means for creating wind at high velocity and delivering it through passages in the lower plane for exerting constant pressure beneath the lower plane in a downward and rearward direction to the rear of the leading edge of the lower plane in take-offs and in flight.

10. In an aircraft structure, a lower plane, an upper plane of less width than the lower plane and disposed in spaced relation with the lower plane with its leading edge behind the leading edge of the lower plane and its trailing edge beyond the trailing edge of the lower plane, a slidable trailing section for the upper plane, a vertical stabilizing fin longitudinally of the lower plane depending from the medial line thereof, a vertical rudder disposed between the leading edges of the planes, means for controlling said rudder, an elevator disposed between the planes to the rear of the vertical rudder, means for controlling said elevator, means for creating wind at high velocity and delivering it through passages in the lower plane for exerting constant pressure beneath the lower plane in a downward and rearward direction to the rear of the leading edge of the lower plane in take-offs and in flight and slidable means adapted to lengthen wind passages in the lower plane toward the leading edge thereof for directing the high velocity wind pressure downwardly toward the leading edge of the lower plane when making a landing.

11. In an aircraft structure, a plurality of planes adapted to penetrate the air longitudinally, blowers carried by the lower plane for creating high velocity air currents to be delivered through passages therein at the rear of the leading edge thereof for maintaining a regular high wind pressure beneath the lower plane.

12. In an aircraft structure, a plurality of planes adapted to penetrate the air longitudinally, blowers carried by the lower plane for creating high velocity air currents to be delivered through passages therein at the rear of the leading edge thereof for maintaining a regular high wind pressure beneath the lower plane and a cabin upon the lower plane providing a space between the same and the upper plane for densifying the air beneath the upper plane when the aircraft is in flight.

13. An aircraft structure embodying a plurality of superimposed planes adapted to penetrate the air longitudinally, supporting wheels, a rudder, an elevator and a pair of motor driven blowers carried by the lowermost plane adapted to create high velocity air currents to be delivered through passages in the lower plane for maintaining a regular high wind pressure beneath the lower plane for buoyantly supporting and creating propulsive action to the aircraft.

14. In an aircraft structure, spaced superposed planes having an upwardly curved breast portion terminating in a tapered leading edge, dipping side edge portions fading out at the leading edge, the lowermost plane having a fixed dipping trailing edge, a flexible slidable trailing edge section for the upper plane, three supporting wheels for the aircraft, a rudder at the forward end of the aircraft, means for turning one of the wheels and the rudder in unison, an elevator disposed to the rear of the rudder, means for controlling the rudder, a pair of blowers carried by the lower plane, a motor for actuating the blowers for creating high velocity air currents to be delivered beneath the lower plane to the rear of the breast portion thereof for maintaining a steady high wind pressure beneath the lower plane which is directed in a downward and rearward direction when taking off and when in flight, means for changing the direction of flow of the air currents from the blower to a downward and forward direction beneath the lower plane when landing and a cabin upon the lower plane providing an air passage between the cabin and the upper plane, said cabin densifying the air beneath the upper plane.

15. In an aircraft embodying a plurality of superimposed planes adapted to penetrate the air longitudinally and means carried by the lowermost plane adapted to create high velocity air currents and discharge same through a passage in the lowermost plane to the rear of the leading edge thereof for setting up a high wind pressure under the lower plane for the purpose of sustenance and propulsion of the aircraft.

16. In an aircraft embodying a plurality of superimposed planes adapted to penetrate the air longitudinally and means carried by the lowermost plane adapted to create high velocity air currents and discharging same through a passage in the lowermost plane to the rear of the leading edge thereof for setting up a high wind pressure under the lower plane and means for directing said high wind pressure downwardly and rearwardly when taking off and when in flight and downwardly and forwardly when landing.

17. In combination with an airplane having superimposed shoe-horn shaped planes to be driven longitudinally through the air, of motor driven means on opposite sides of the longitudinal axis of the airplane and disposed between the planes for generating high velocity air currents adapted to be delivered toward the rear of the airplane through openings in the lower plane for setting up high wind pressure of great density under the lower plane to propel and sustain the airplane in flight and directed forwardly and downwardly to retard the speed of the airplane in landing.

18. In combination with an airplane having superimposed shoe-horn shaped planes to be driven longitudinally through the air, of motor driven means on opposite sides of the longitudinal axis of the airplane and disposed between the planes for taking in air from the sides of the airplane and generating it into high velocity air currents to be delivered through openings in the lower plane toward the rear thereof for setting up high velocity wind pressure of great density under the lower plane to propel and sustain the airplane in flight and slidable means associated with the motor driven means for changing the direction of flow of the generated air currents from a rearward direction to a downward and forward direction under the lower plane to retard the speed of the airplane and still render buoyancy to the airplane when landing.

In testimony whereof, I have hereunto affixed my signature.

CARL G. THOMPSON.